July 21, 1953
A. ISABELLA
2,646,211
BOUNDARY LAYER CONTROL FOR COMPRESSOR INLET DUCTS
Filed June 3, 1949
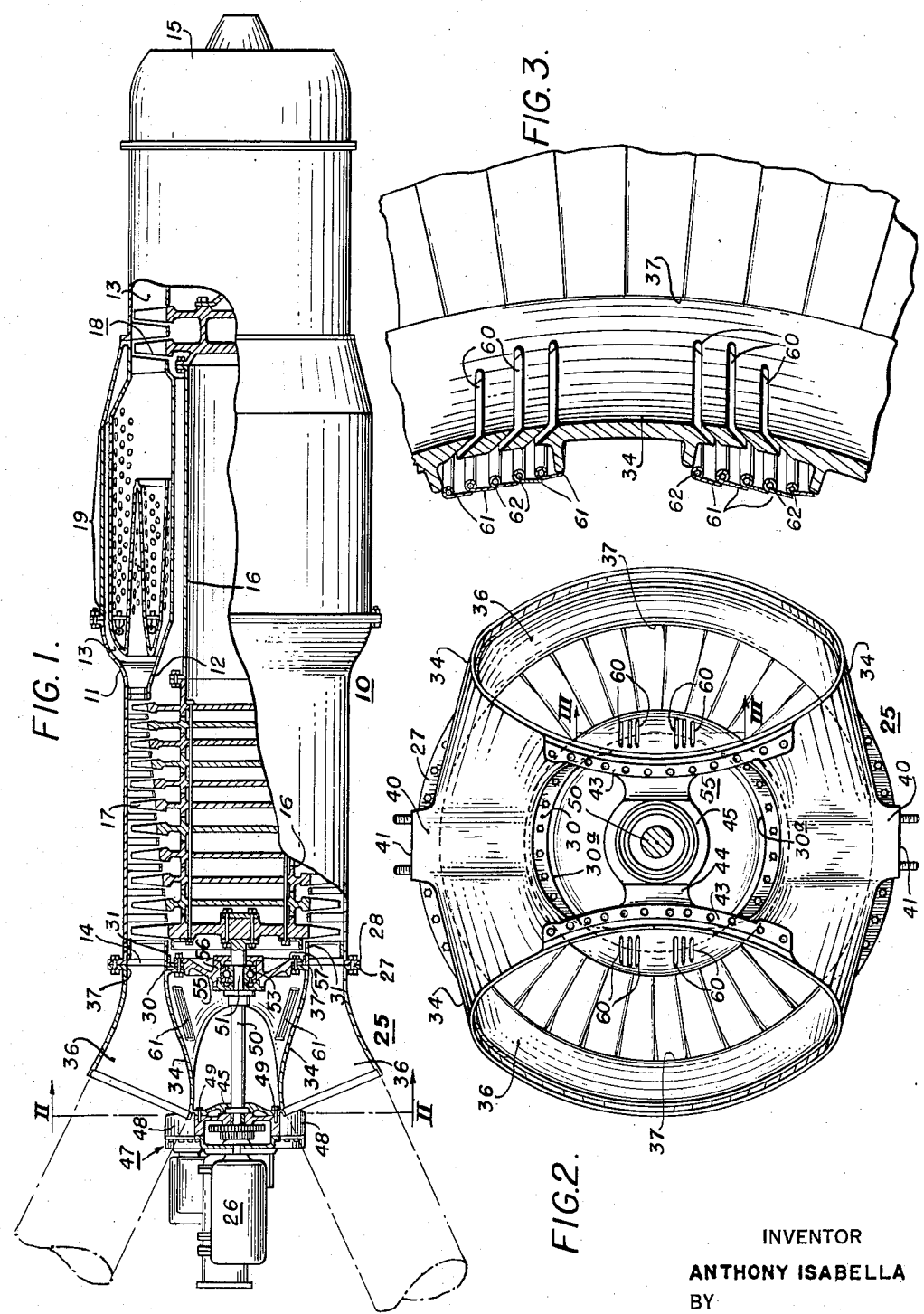
INVENTOR
ANTHONY ISABELLA
BY
ATTORNEY Patented July 21, 1953

2,646,211

UNITED STATES PATENT OFFICE 2,646,211

BOUNDARY LAYER CONTROL FOR COMPRESSOR INLET DUCTS

Anthony Isabella, Philadelphia, Pa., assignor to Westinghouse Electric Corporation, East Pittsburgh, Pa., a corporation of Pennsylvania Application June 3, 1949, Serial No. 96,890

1 Claim. (Cl. 230—132)

This invention relates to gas turbine power plants, and more particularly, to an aviation gas turbine engine equipped with an inlet duct structure for supplying air to the compressor of the engine.

Careful design of the inlet duct structure of a gas turbine engine for aircraft is desirable, not only to minimize any tendency to lower compressor inlet pressure with consequent increase in turbine temperature, but also to maintain uniform velocity and pressure distribution of air at the face of the engine compressor, so as to ensure against impairment of compressor efficiency. A poor velocity distribution at the inlet of an axial flow compressor may, for example, impose a cyclical load on the compressor, promoting vibration and possible failure of the blades.

It has been proposed to provide a bifurcated inlet duct for supplying air to the inlet of a compressor in a gas turbine power plant, such as that disclosed in the copending patent application of Arnold H. Redding and Marcus C. Benedict, Serial No. 133,804, filed December 19, 1949, now Patent No. 2,618,119 and assigned to the assignee of the present application. With this construction, certain flight operational conditions may tend to effect accumulation of low velocity boundary layer air from the separate branch duct portions in the junction regions thereof, or in the top and bottom of the annular inlet of the compressor, assuming that the bifurcated duct is mounted with the branches diverging horizontally. Such a condition may tend to develop unstable velocity and pressure of the air during flow into the compressor.

It is a principal object of the present invention to provide an improved compressor inlet duct having means for diverting boundary layer air at certain points in order to ensure uniform velocity and pressure distribution of air at the inlet annulus of the compressor.

Another object of the invention is the provision of a diverging inlet duct structure for a gas turbine power plant, having slots formed therein for bleeding off the turbulent boundary layer of air, to prevent such air from sliding into diametrically opposite regions of the compressor blade annulus.

A further object is to provide compressor inlet duct apparatus having the foregoing features of construction together with means for preventing reversal of air flow during operation under a static condition.

These and other objects are effected by the invention as will be apparent from the following description and claim taken in connection with the accompanying drawings, forming a part of this application, in which:

Fig. 1 is a diagrammatic top view, partly in section, of a typical gas turbine power plant having an inlet duct constructed in accordance with the invention;

Fig. 2 is a sectional frontal end view, in enlarged detail, of the divergent duct structure shown in Fig. 1 taken substantially along the line II—II thereof; and Fig. 3 is a fragmentary enlarged detail sectional view taken substantially along the line III—III of Fig. 2.

Referring to Fig. 1, the gas turbine power plant 10 therein disclosed in diagrammatic form comprises an outer substantially tubular casing structure 11 having mounted therein a coaxially arranged core structure indicated generally at 12, forming an annular fluid flow passage 13, which extends axially through the plant from a forwardly-disposed air inlet 14 to a rearwardly-disposed nozzle 15. Suitably journaled within the engine 10 is a rotor indicated generally by the reference character 16, the forward end of which constitutes the rotor of an axial-flow compressor 17, and the rear end of which constitutes the rotor of a turbine 18. Annular combustion apparatus 19 is interposed in the passage 13 between the discharge end of the compressor 17 and the inlet of the turbine 18. In operation, air entering the compressor by way of the annular inlet 14 is compressed by the compressor 17 and delivered to the combustion apparatus 19, in which fuel is burned to provide motive fluid, which is expanded through the turbine 18 for driving the compressor, and finally exhausted to the atmosphere by way of the nozzle 15, usually in the form of a jet establishing a propulsive thrust.

A bifurcated air intake duct or casing section 25 is carried on the engine 10 forwardly of the compressor 17, for supporting an assemblage of accessory devices, indicated generally by the reference character 26, which may include lubricant and fuel pumps, starter apparatus, fuel governor apparatus and a gear box suitable for cooperation with the power plant in the usual well-known manner. The casing section 25 comprises an outer wall portion having an annular flange 27 bolted to a complementary flange 28 formed on the outer casing structure 11, and an inner wall portion having a concentric flange 30 which registers with the inner shroud of the usual compressor inlet nozzle assembly 31. The inner and outer walls of the casing section 25 merge to form a Y-shaped structure including outwardly spreading or relatively diverging duct portions 34, each of which is substantially elliptical in cross-section, thus forming a main annular passage 37 communicating with the compressor inlet 14 and branching into two air intake passages 36, which may be connected to suitable tubing, indicated by broken lines, for supplying air to the engine when mounted in an aircraft.

As best shown in Fig. 2 of the drawings, the portions of the casing section 25 at the juncture of the diverging duct portions 34 are reinforced by the provision of enlarged crotch portions 40, which may be made hollow to reduce weight and terminate in outwardly disposed bolting pads 41, for facilitating the mounting of the engine in the aircraft fuselage or wing. Formed on the inner lip of each of the duct portions 34 is an arcuate bolting pad 43, the two bolting pads being joined by a bridging portion 44 having a central bearing support portion 45, which is coaxially aligned with the opening 30a formed within the annular flange 30.

The accessory assemblage 26, as already explained, includes a suitable gear box, indicated by the reference character 47, which has formed on a flat rearwardly-disposed face thereof a pair of arcuate bolting pads 48, which are complementary to the bolting pads 43 of the duct section and may be secured thereto by suitable bolts 49. The gear box 47 is provided with a drive shaft 50, which is suitably connected to the operating elements of the accessory assemblage through the medium of gearing (not shown). Referring to Fig. 1, when the elements of the power plant are assembled the shaft 50 is operatively coupled through the medium of a shaft 51 to the rotor 16 of the engine, the forward end of the shaft 51 being suitably journaled in the bearing support portion 45 of the casing section 25. For supporting the forward bearing of the engine, sometimes called the No. 1 or compressor bearing, and indicated generally by the reference character 53, there is provided a disk member 55, which has an inner annular flange 56 carrying the bearing 53, and an outer annular flange 57 suitably bolted to the annular flange 30 of the casing section 25.

According to the invention, in order to facilitate maintenance of uniform air flow and pressure distribution at the compressor inlet, a plurality of longitudinally disposed slots 60 are formed in the inner sides of the duct portions 34, that is, in the sides of the duct portions which are disposed nearest the axial shaft 50. Through these slots 60 part of the boundary air flowing adjacent the walls of the passages 36 can be diverted into the open space between the diverging duct portions, when the engine is operated under normal flight conditions. Since the boundary air at these points tends to flow at a much lower velocity than the main air streams flowing through the passages 36 converging toward the annular compressor inlet 14, and may even develop a tendency to flow in a reverse direction, causing undesirable turbulence, the bleeding of such air from the passages will ensure against impairment of the otherwise uniform velocity and pressure distribution of the air at the compressor inlet. Air thus bled through the slots 60 may be further utilized for facilitating the cooling of the bearing 53 and the adjacent accessory assemblage 26.

For preventing possible reversal of air flow through the slots 60, as during static operation of the engine on the ground, a plurality of shutters 61 may be mounted at the outlet side of the slots, each shutter being hinged on one of a corresponding number of pins 62 suitably carried on the respective duct portions 34, as best shown in Fig. 3 of the drawing. It will be apparent that the shutters 61 are thus adapted to permit only inward flow of air, or flow from the passages 36 into the space containing the bearing 53. Each shutter acts as a check valve to prevent flow in the opposite direction.

While I have shown my invention in but one form, it will be obvious to those skilled in the art that it is not so limited, but is susceptible of various changes and modifications without departing from the spirit thereof.

What I claim is:

An inlet duct structure for supplying air to the compressor inlet of an aviation power plant, comprising annular inner and outer wall portions adapted to be mounted on the casing structure of the power plant for providing a main annular axial flow passage, a pair of inlet duct portions diverging from said wall portions for providing branch inlet passages merging into said annular passage, said passages serving to contain compressor inlet air flowing at higher pressure than that of atmospheric air outside the power plant during flight operation, said inlet duct portions having bleed ports formed in the walls thereof contiguous to said inner wall portion of the main annular passage, said ports communicating with the atmosphere and thereby serving to withdraw sufficient low velocity boundary layer air from the interior wall surface of each duct portion to ensure uniform velocity and pressure distribution of air from said branch inlet passages throughout said annular flow passage during flight operation of said power plant, and a plurality of air pressure responsive shutter elements pivotally mounted on said duct portions and movable to open said ports while the inlet air pressure flowing in said duct passages exceeds that of the atmosphere, said shutter elements being hinged at their upper sides and hung over said ports for preventing back flow of atmospheric air into said branch inlet passages during static operation of said power plant.

ANTHONY ISABELLA.

References Cited in the file of this patent

UNITED STATES PATENTS

| Number | Name | Date |
|---|---|---|
| 1,957,413 | Price | May 1, 1934 |
| 2,037,940 | Stalker | Apr. 21, 1936 |
| 2,084,463 | Stalker | June 22, 1937 |
| 2,305,226 | Stalker | Dec. 15, 1942 |
| 2,459,935 | Halford | Jan. 25, 1949 |
| 2,471,892 | Price | May 31, 1949 |

FOREIGN PATENTS

| Number | Country | Date |
|---|---|---|
| 619,722 | Great Britain | Mar. 14, 1949 |